(12) United States Patent
Pomedli et al.

(10) Patent No.: US 7,481,278 B1
(45) Date of Patent: Jan. 27, 2009

(54) SYSTEM AND METHOD FOR A DISC OPENER WITH GAUGE WHEEL DEPTH ADJUSTMENT ASSEMBLY

(75) Inventors: Barry Pomedli, Saskatoon (CA); Brad Hicks, Saskatoon (CA); Eric Anderson, Saskatoon (CA)

(73) Assignee: CNH America, LLC, Racine, WI (US)

( * ) Notice: Subject to any disclaimer, the term of this patent is extended or adjusted under 35 U.S.C. 154(b) by 0 days.

(21) Appl. No.: 11/939,638

(22) Filed: Nov. 14, 2007

(51) Int. Cl.
*A01B 15/00* (2006.01)
*A01B 23/00* (2006.01)
*A01B 31/00* (2006.01)
*A01B 63/16* (2006.01)
*A01B 79/00* (2006.01)

(52) U.S. Cl. .......................... 172/1; 172/395; 172/397; 172/736; 172/739; 172/748; 172/762; 111/69; 111/167; 111/194

(58) Field of Classification Search ............ 172/1, 172/547, 558–566, 610, 734–739, 748, 762, 172/538, 701, 539, 520, 519, 239, 395, 421, 172/397; 111/69, 134–137, 163, 164, 168, 111/200, 192, 193, 149, 150, 157, 167, 170, 111/174, 176, 190, 191, 194, 195, 62, 196
See application file for complete search history.

(56) References Cited

U.S. PATENT DOCUMENTS

| | | | |
|---|---|---|---|
| 47,618 A | 5/1865 | Carhart | |
| 465,731 A | 12/1891 | Sayre, Jr. | |
| 748,318 A | 12/1903 | Squyars | |
| 1,147,420 A | 7/1915 | Mongtomery | |
| 1,243,758 A | 10/1917 | Owen | |
| 1,351,850 A | 9/1920 | Herndon | |
| 1,631,008 A | 5/1927 | Chappell | |
| 2,687,681 A | 8/1954 | Phenice | |
| 4,240,508 A | 12/1980 | Ishiguro et al. | |
| 6,148,747 A | 11/2000 | Deckler et al. | |
| 6,644,223 B2 | 11/2003 | Prairie et al. | |
| 6,935,253 B2 | 8/2005 | Murray et al. | |

FOREIGN PATENT DOCUMENTS

EP 0372901 A2 6/1990

*Primary Examiner*—Christopher J. Novosad
(74) *Attorney, Agent, or Firm*—Rebecca Henkel (57) ABSTRACT

A disc opener system for attachment to an agricultural vehicle for opening a seed trench. The system includes a main arm, a disc opener mounted to the main arm, a gauge wheel mounted about a pivot axis to the main arm, a gauge wheel mounted for rotation on the gauge arm, and a depth adjustment assembly for adjusting and positively locking a position of the gauge wheel relative to disc opener. The depth adjustment assembly includes an adjustment link mounted to the main arm, an adjustment coupling attached to the gauge arm, a handle pivotably attached to the adjustment coupling and a clip attached to the adjustment coupling. The clip locks the handle in a position where it mates the adjustment link and adjustment coupling to fix the position of the gauge wheel relative to the disc opener.

20 Claims, 10 Drawing Sheets

SYSTEM AND METHOD FOR A DISC OPENER WITH GAUGE WHEEL DEPTH ADJUSTMENT ASSEMBLY

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to agricultural vehicles, and more particularly, to a system and method for a disc opener with a gauge wheel depth adjustment assembly.

BACKGROUND OF THE INVENTION

Agricultural vehicles, such as tractors and combines, are ubiquitous in the agricultural industry. As an agricultural vehicle travels across a field, agricultural processes such as plating and/or fertilizing are performed by an implement associated with the vehicle. One particular class of implements, such as seed planters, incorporate a disc opener to open a seed trench in which to plant the seed. Efficient crop growth requires that seeds be planted in different manners that depend at least in part upon soil conditions, fertilizer employed, seed type, and anticipated weather and sun exposure conditions. To this end, a seed planter trench opener disc must be capable of opening a seed trench to a selected depth and accurately placing seeds therein to assure that the seed is properly positioned in the soil.

Existing seed planters include various types of depth adjusting mechanisms to control trench depth. One particularly useful type of depth adjusting mechanism provides gauge wheels that, when in a depth adjusting position, have a bottom wheel surface that generally resides proximate and vertically above the bottom disc edge of an associated trenching opener disc. Here, the wheel travels along a field surface and therefore limits disc depth into the soil. In many cases a plurality of disc openers are each independently mounted to a support bar for towing behind a tractor or the like and a separate gauge wheel is mounted to each of the disc openers via an adjustable linkage mechanism so that the vertical height difference (hereinafter "the surface-edge difference") between the bottom wheel surface and the bottom disc edge is adjustable. For instance, an exemplary disc-wheel configuration may be adjustable so that the surface-edge difference can be set in increments to between one and five inches.

Unfortunately, most depth control mechanisms of the type described above have one or more shortcomings. For instance, some depth control mechanisms of the above type have poorly located depth adjustments that make it difficult for an operator to access the adjusting mechanism. Some adjusting mechanisms require an operator to perform complex manipulations and to assume awkward positions when performing adjustments. Other adjusting mechanisms utilize a threaded shaft that takes a large amount of time to adjust and that has a tendency to seize up due to rust or become bound up due to accumulation of field debris. Still other adjusting mechanisms utilize one or a plurality of nut and bolt pairs to facilitate adjustment, these mechanisms often require two hands and are time consuming to manipulate. Moreover, many mechanisms require a large number of complex components that have small tolerances, are relatively expensive to manufacture, and assemble, and are expensive to maintain and replace when damaged. Furthermore, some mechanisms are difficult to manipulate because the mechanical advantage afforded by the mechanism designs is less than optimal. In addition, at least some prior mechanisms have increased the width of an associated seeding row unit disadvantageously.

On the other hand, in the case of depth control mechanisms that are easy to operate, it is often possible to easily disengage the depth control mechanisms during the seeding operation in the field, which can result in seeds being planted at the improper trench depth. For example, these mechanisms can be disengaged by debris and other residue material that is kicked up from the soil during operation. Moreover, in the case of mechanisms that rely on biasing springs to provide an the locking force and thereby reduce the difficulty of actuation, these springs can weaken over time so that only very little force is needed to disengage the mechanism. Therefore, debris and other residue material can easily overcome the spring force of the weakened springs and allow for undesired trench depth.

Thus, it would be advantageous to have a seed planter disc opener system that is capable of being positively-locked to prevent accidental disengagement by debris, that provides a conveniently located depth control mechanism, that is easy to operate, that requires minimal, simple, and robust components, and that is inexpensive to manufacture, assemble, and maintain.

SUMMARY OF THE INVENTION

The present invention overcomes the aforementioned drawbacks by providing an improved latching system that protects against undesired adjustment, is convenient to operate, and does not require complex manufacturing or maintenance processes.

A disc opener assembly for attachment to an agricultural vehicle in accordance with one aspect of the invention includes a main arm, a disc opener mounted to the main arm, a gauge wheel mounted for rotation on the gauge arm, and a depth adjustment assembly for adjusting a position of the gauge wheel relative to the disc opener. The depth adjustment assembly includes an adjustment link, an adjustment coupling configured to selectively engage the adjustment link, a handle configured to rotate the gauge arm about the pivot axis and selectively place the adjustment link into engagement with the adjustment coupling, and a spring clip configured to engage the handle to positively lock the depth adjustment assembly.

The assembly may be configured to only be disengaged by a force applied generally from a side of the depth assembly opposite the pivot axis.

Furthermore, the handle may include a cam that forces the adjustment link into engagement with the adjustment coupling when the handle is rotated in a direction towards the pivot axis.

According to at least one embodiment, the handle may also include a plurality of ratchet teeth. The spring clip may be configured to positively lock the depth adjustment assembly by engaging at least one of the plurality of ratchet teeth.

A disc opener assembly for attachment to an agricultural vehicle in accordance with one aspect of the invention includes a main arm, a disc opener mounted to the main arm, a gauge wheel mounted for rotation on the gauge arm, and a depth adjustment assembly for adjusting a position of the gauge wheel relative to the disc opener. The depth adjustment assembly may include an adjustment link mounted to the main arm, an adjustment coupling attached to the gauge arm, a handle attached to the adjustment coupling, and a spring clip attached to the adjustment coupling. The adjustment link may include a link mating surface and a link camming surface. The adjustment coupling may include a yoke, a channel configured to receive the adjustment link, and a coupling mating surface configured to mate with the link mating surface. The adjustment link may be positioned within the channel and the coupling mating surface may be positioned adjacent to the link mating surface. The handle may be pivotably attached to the yoke and may include a plurality of ratchet teeth configured to engage the link camming surface to force the link mating surface to mate with the coupling mating surface. The spring clip may be configured to engage at least one of plurality of ratchet teeth.

According to at least one embodiment, the position of the gauge wheel relative to the disc opener may be positively locked when the spring clip engages at least one of the plurality of ratchet teeth to mate the link mating surface with the coupling mating surface. Furthermore, the spring clip may be disengaged from the at least one of the plurality of ratchet teeth by a force applied from a side of the clip opposite the pivot axis.

Furthermore, the depth adjustment assembly may be only disengaged by a force applied in a direction at least partially towards the pivot axis.

Additionally, according to at least one embodiment, the link mating surface may comprise a plurality of link teeth and the coupling mating surface may comprise a plurality of coupling teeth. The link teeth and the coupling teeth may be aligned with respect the pivot axis. Moreover, the coupling teeth may have a coupling tooth profile with a varied width. Furthermore, the coupling teeth may have a tapered tooth profile.

The adjustment link may include an annular portion arcing about the pivot axis. Furthermore, the adjustment link may include a plurality of teeth extending across the annular portion and extending radially with respect to the pivot axis.

Furthermore, the assembly may include a plurality of markings formed on the adjustment link to form an adjustment increment display.

In accordance with yet another aspect of the invention, a method for adjusting a gauge wheel about a pivot axis to change a position of the gauge wheel relative to a disc opener of a disc opener assembly is disclosed. The method includes providing a depth adjustment assembly including an adjustment link, an adjustment coupling configured to selectively engage the adjustment link, a handle configured to rotate the gauge wheel about the pivot axis and selectively place the adjustment link into engagement with the adjustment coupling, and a spring clip configured positively lock depth adjustment assembly by engaging the handle. Additionally, the method includes rotating the gauge wheel to a selected position, actuating the handle to place the adjustment link into engagement with the adjustment coupling, and positively locking the depth adjustment assembly.

The method may also include unlocking the depth adjustment assembly by actuating the spring clip to allow the handle to move to a position where the adjustment link and the adjustment coupling can be disengaged.

Furthermore, the step of positively locking the depth adjustment assembly may include engaging the spring clip with at least one of a plurality of ratchet teeth formed on the handle.

Additionally, the method may also include unlocking the depth adjustment assembly with a force applied generally from a side of the depth adjustment assembly opposite the pivot axis.

Furthermore, step of actuating the handle to place the adjustment link into engagement with the adjustment coupling may include mating a plurality of coupling teeth formed radially along the pivot axis on the adjustment link with a plurality of coupling teeth formed radially along the pivot axis on the adjustment coupling.

The foregoing and other advantages of the invention will appear in the detailed description that follows. In the description, reference is made to the accompanying drawings, which illustrate preferred example embodiments of the invention.

DETAILED DESCRIPTION OF THE EXAMPLE EMBODIMENTS

Figure 1:
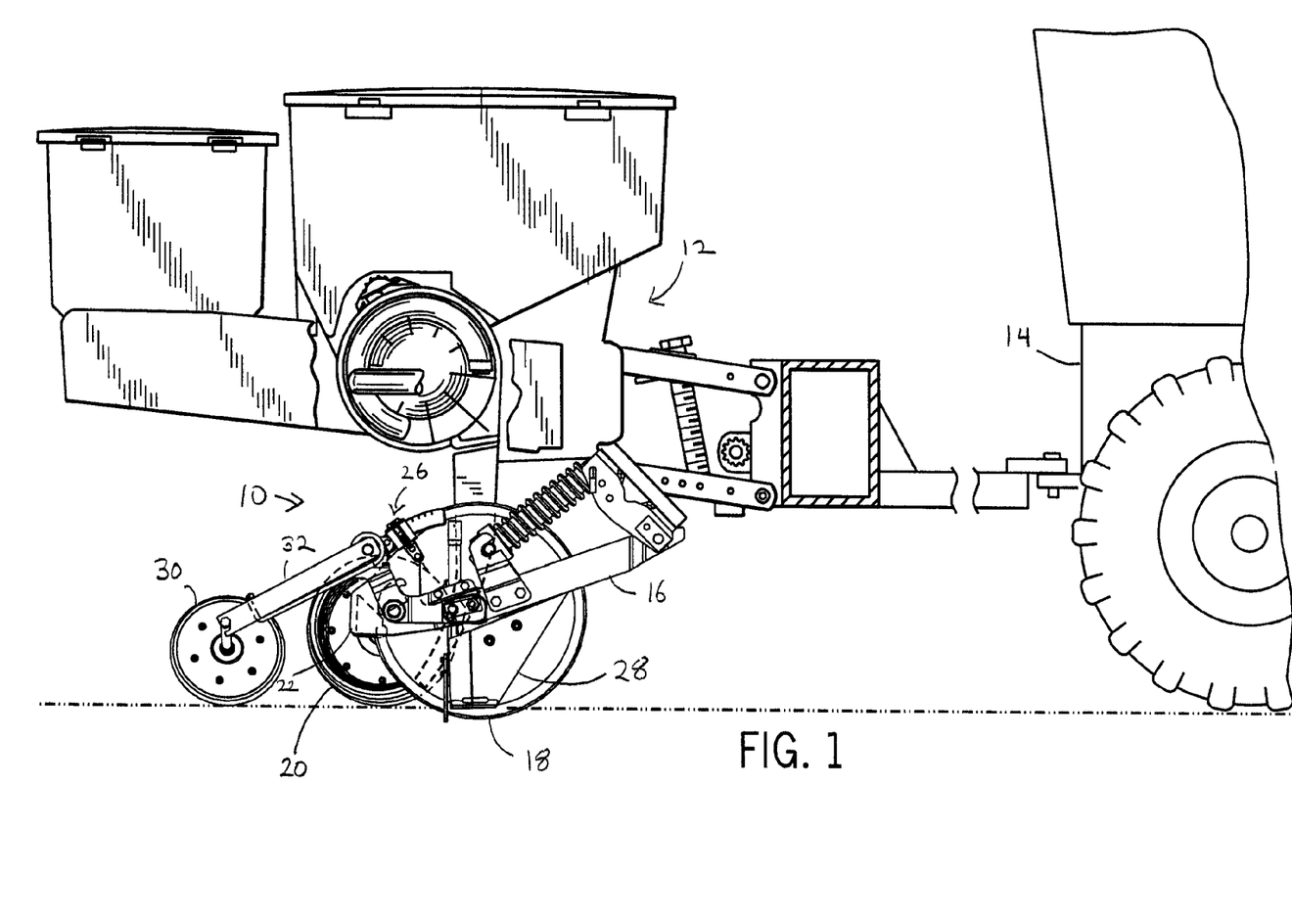
FIG. 1 is a side elevation view of a disc opener system attached to an agricultural vehicle.

FIG. 1 illustrates a disc opener system 10 in accordance with the present invention installed in a seed planting implement 12 attached to an agricultural vehicle 14. Although disc opener assembly 10 is shown with a particular type of seed planter and a particular type of agricultural vehicle, it should be understood that disc opener system 10 can be used with different seed planting implements and agricultural vehicles.

Referring now to FIGS. 1 through 4, disc opener system 10 includes a main arm 16 attached to seed planting implement 12. A disc opener 18 is fixedly attached for rotation to main arm 16. A gauge wheel 20 is attached for rotation to a gauge arm 22 that is attached about a pivot axis 24 to main arm 16.

Gauge wheel 20 rides over the soil and limits the depth of the trench that disc opener 18 cuts in the soil. When operating as shown in FIG. 1, disc opener 18 cuts a trench in the soil as disc opener 18 is pulled through a field by the agricultural vehicle 14. A depth adjustment assembly 26 is attached to gauge arm 22 and, as described in more detail below, controls the depth of the trench by setting the position of gauge wheel 20 relative to disc opener 18, which thereby sets the position of disc opener 18 relative to the soil. Specifically, the relative vertical positions of the lower edges of disc opener 18 and gauge wheel 20 sets the depth of the trench. A disc scraper 28 is mounted to main arm 16 and is aligned with disc opener 18 to clean soil and plant debris from disc opener 18. A packer wheel 30 is connected by a packer arm 31 to main arm 16 and is positioned to close the seed trench created by disc opener 18.

Figure 2:
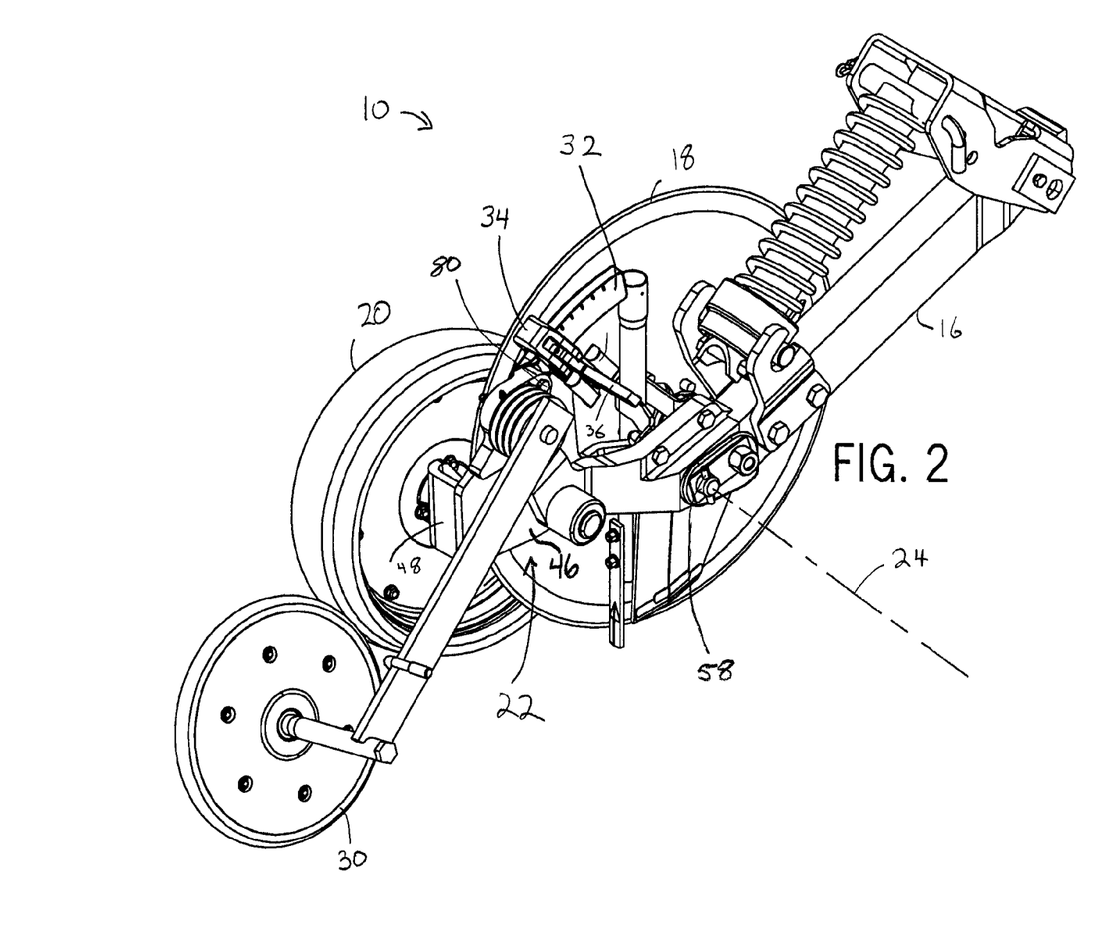
FIG. 2 is a perspective view of a disc opener system.
Figure 3:
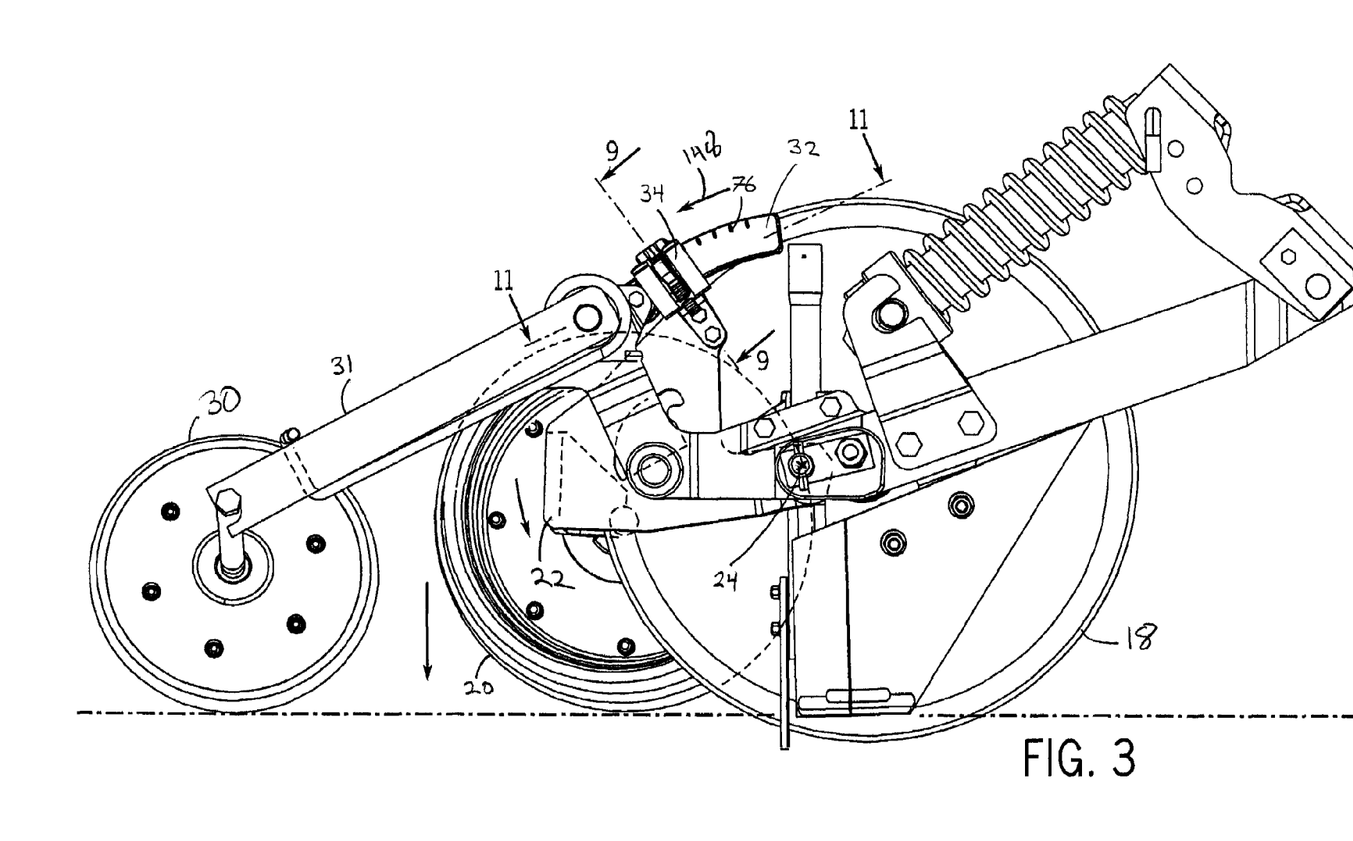
FIG. 3 is a side elevation view of the disc opener system illustrated in FIG. 2 adjusted to a depth.
Figure 4:
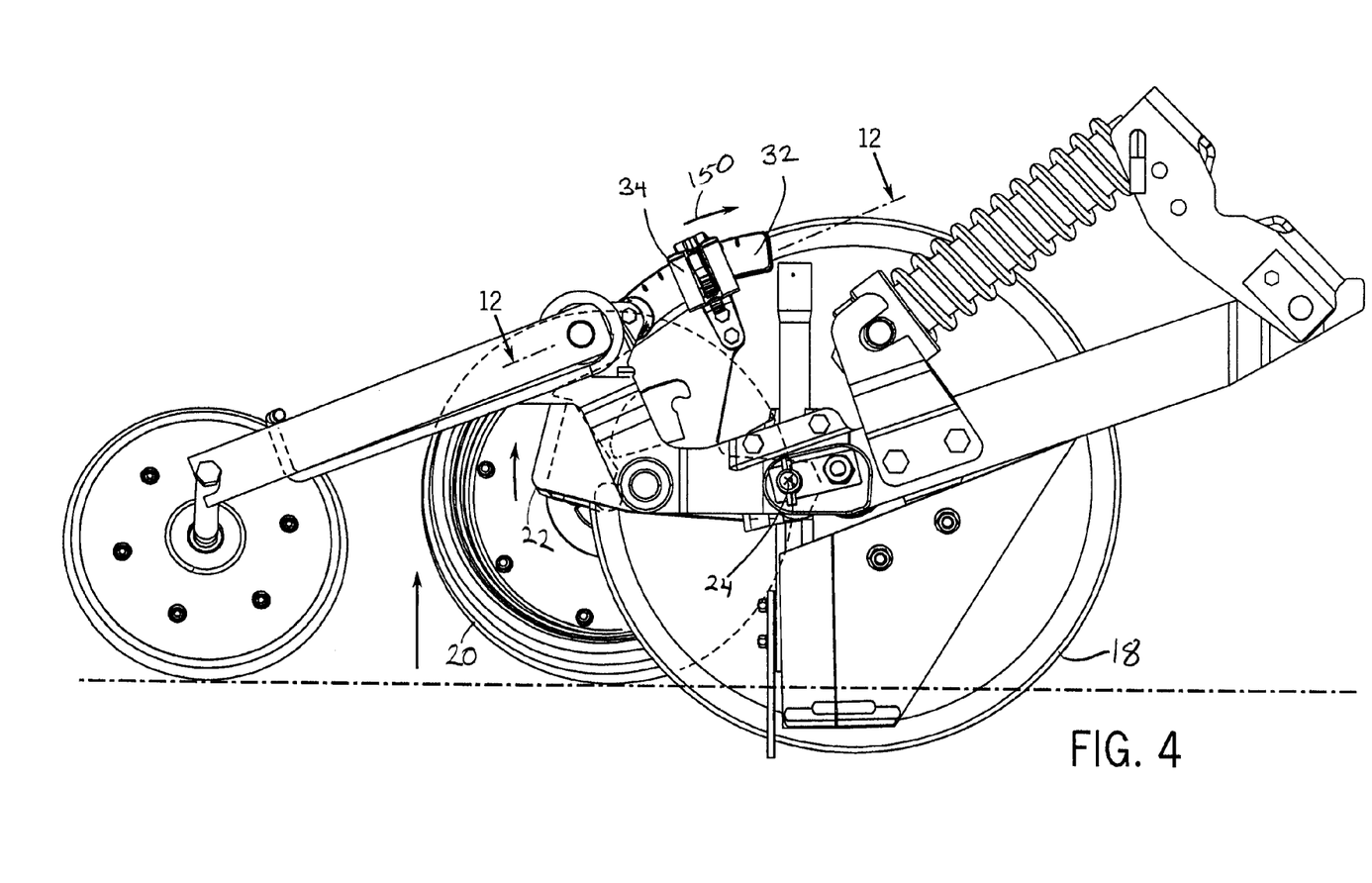
FIG. 4 is a side elevation view of the disc opener system illustrated in FIG. 2 adjusted to a deeper depth than shown in FIG. 3.

Referring now to FIGS. 2 through 6, depth adjustment assembly 26 includes an adjustment link 32, an adjustment coupling 34, a handle 36 and a spring clip 38. Depth adjustment assembly 26 is used to select the depth of the trench that disc opener 18 cuts in the soil by setting the position of gauge wheel 20 relative to disc opener 18. The position of the gauge wheel 20 relative to disc opener 18 is changed by pivoting gauge wheel 20 about pivot axis 24 of gauge arm 22. As shown in FIG. 3, depth adjustment assembly 26 can set a shallow trench by rotating gauge arm 22 so that gauge wheel 20 moves downward to reduce the vertical distance between the lower edges of gauge wheel 20 and disc opener 18. As shown in FIG. 4, depth adjustment assembly 26 can set a deeper trench by rotating gauge arm 22 so that gauge wheel 20 moves upward to increase vertical distance between the lower edges of gauge wheel 20 and disc opener 18. Depth adjustment assembly 26 is used to manipulate the gauge arm 22, and hence gauge wheel 20, into a position and then lock gauge arm 22, which locks the position of gauge wheel 20 relative to disc opener 18. Link 32 is fixedly attached to main arm 16 and coupling 34 is fixedly attached to gauge arm 22. Coupling 34 includes a coupling channel 40 through which link 32 extends. Coupling 34 can be moved around link 32, which has a fixed position, and then coupling 34 and link 32 can be mated to select the desired trench depth. Link 32 includes a link mating surface 42 and adjustment coupling 34 includes a coupling mating surface 44, the mating surfaces 42 and 44 are configured to be pressed into engagement. Handle 36 is configured to cam against adjustment link 32 to mate adjustment link 32 with coupling 34, and spring clip 38 is configured to lock handle 36 against adjustment link 32, which locks adjustment link 32 against coupling 34 in a mated state. To later change the trench depth, spring clip 38 can be moved to unlock handle 36 from engagement with adjustment link 32, which allows adjustment link 32 to become disengaged from adjustment coupling 34 so that a different trench depth can be selected.

Figure 6:
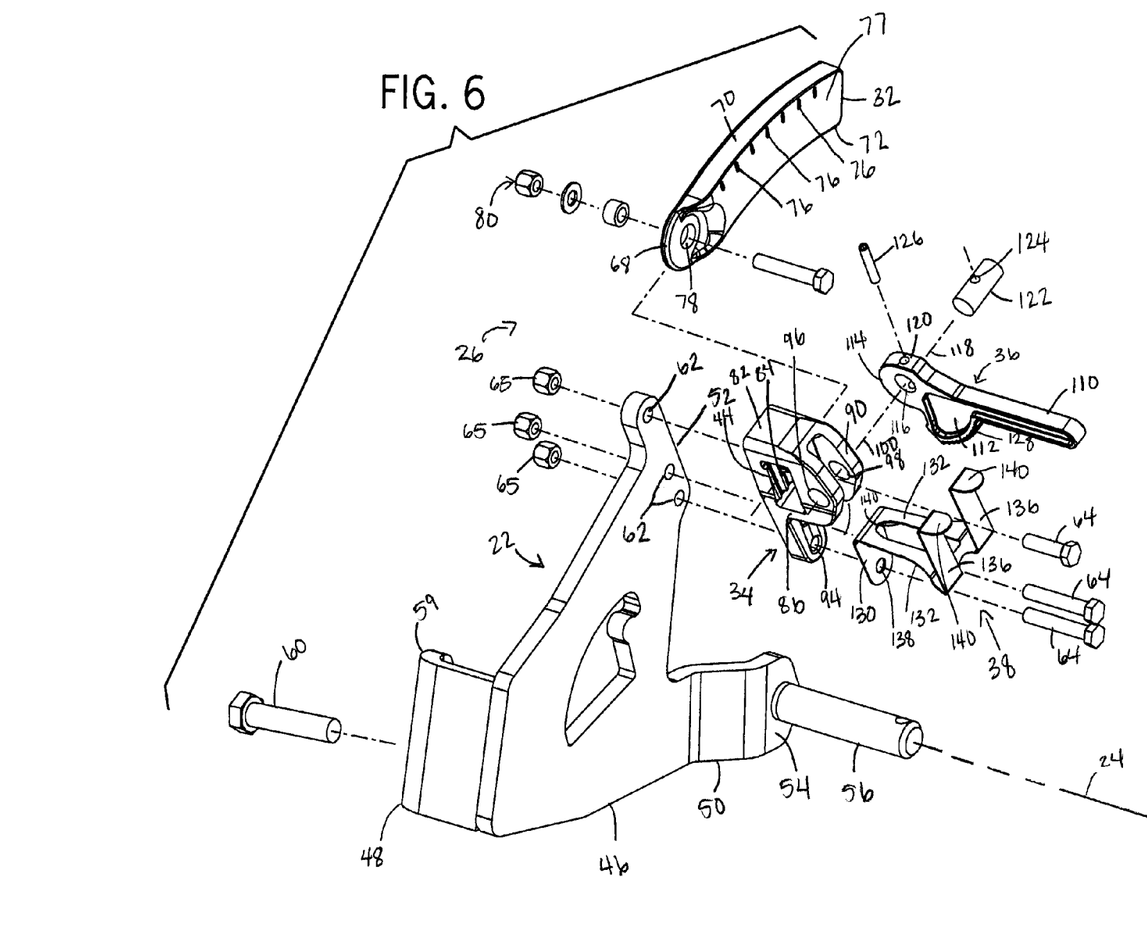
FIG. 6 is an exploded perspective view of the gauge wheel depth adjustment system illustrated in FIG. 5.

Referring now to FIGS. 2 and 6, gauge arm 22 is pivotably attached to main arm 16 about pivot axis 24 to allow gauge arm 22 to change the position of gauge wheel 20 relative to disc opener 18, which is in a fixed position relative to main arm 16. Gauge arm 22 is configured so that disc opener 18 is positioned between main arm 16 and gauge wheel 20. Gauge arm 22 includes a gauge arm body 46, a gauge wheel attachment arm 48, a pivot arm 50, and a coupling attachment arm 52. Gauge arm body 46 and coupling attachment arm 52 lie in the same plane. Pivot arm 50 includes a pivot face 54 and a pivot pin 56 that extends from pivot face 54. Pivot arm 50 extends away from the plane formed by gauge arm body 46 and then bends so that pivot face 54 is substantially parallel to main body 46. Pivot pin 56 forms pivot axis 24 and extends perpendicularly from pivot face 54. Pivot pin 56 is pivotably attached to main arm 16 with pivot hardware 58 (see FIG. 2). Gauge wheel attachment arm 48 extends perpendicularly away from gauge arm body 46 in a direction opposite to the direction that pivot pin 56 extends from pivot arm 50 and then bends perpendicularly in a direction towards pivot pin 56 thereby providing a mounting surface 59 that is substantially parallel to gauge arm body 46 (see FIG. 2). A bolt 60, or similar attachment hardware rotatably attaches gauge wheel 20 to gauge wheel attachment arm 48. Coupling attachment arm 52 extends from gauge arm body 46 and includes a plurality of openings 62 that are linearly aligned along a line extending perpendicularly from pivot axis 24. A plurality of bolts 64 extends through openings 62 to receive respective nuts 65 thereby attach gauge arm 22 to adjustment coupling 34, which is positioned on an opposite side of disc opener 18 than gauge wheel 20 (see FIG. 2).

Figure 7:
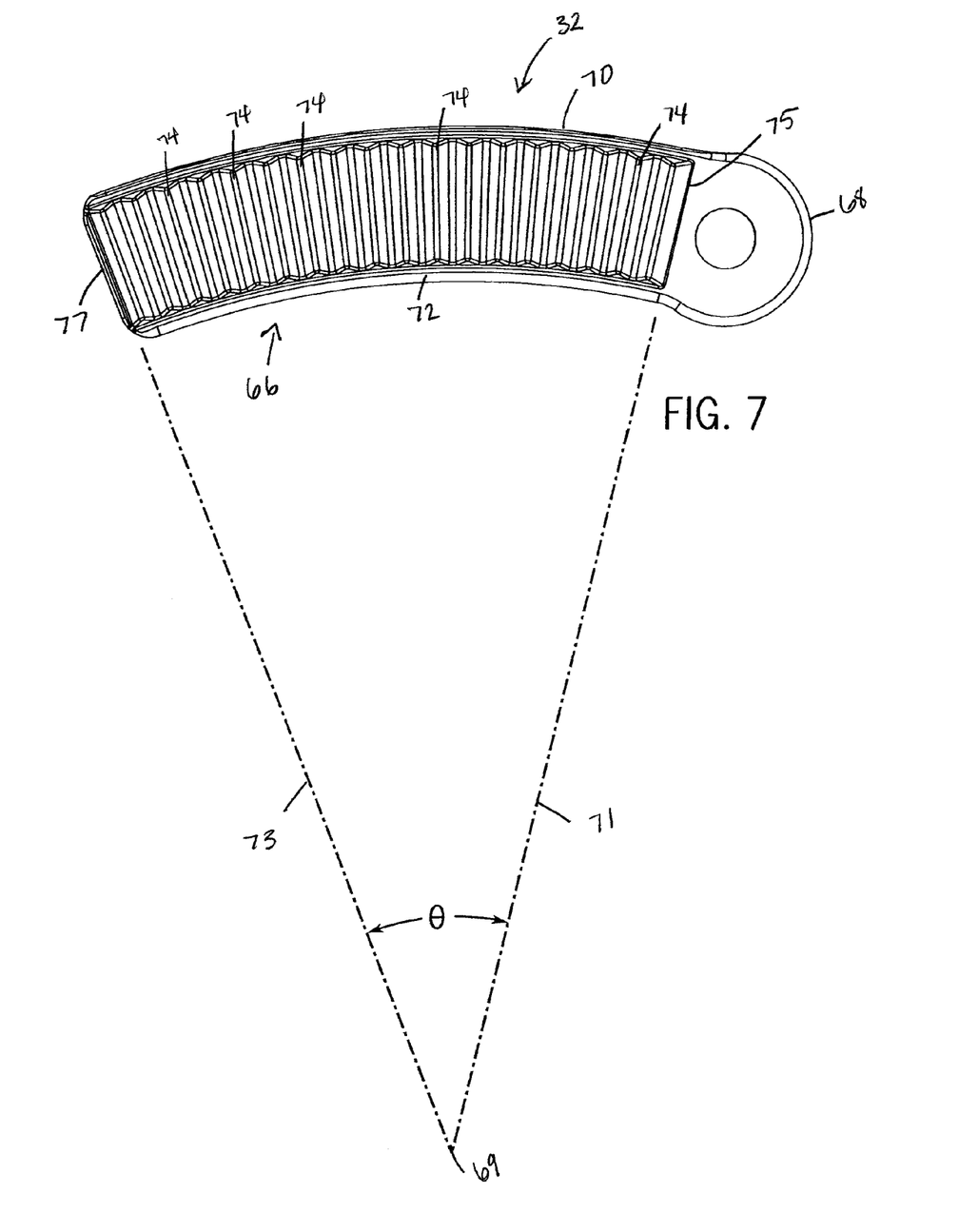
FIG. 7 is a side elevation view of an adjustment link of the gauge wheel depth adjustment system illustrated in FIG. 5.
Figure 8:
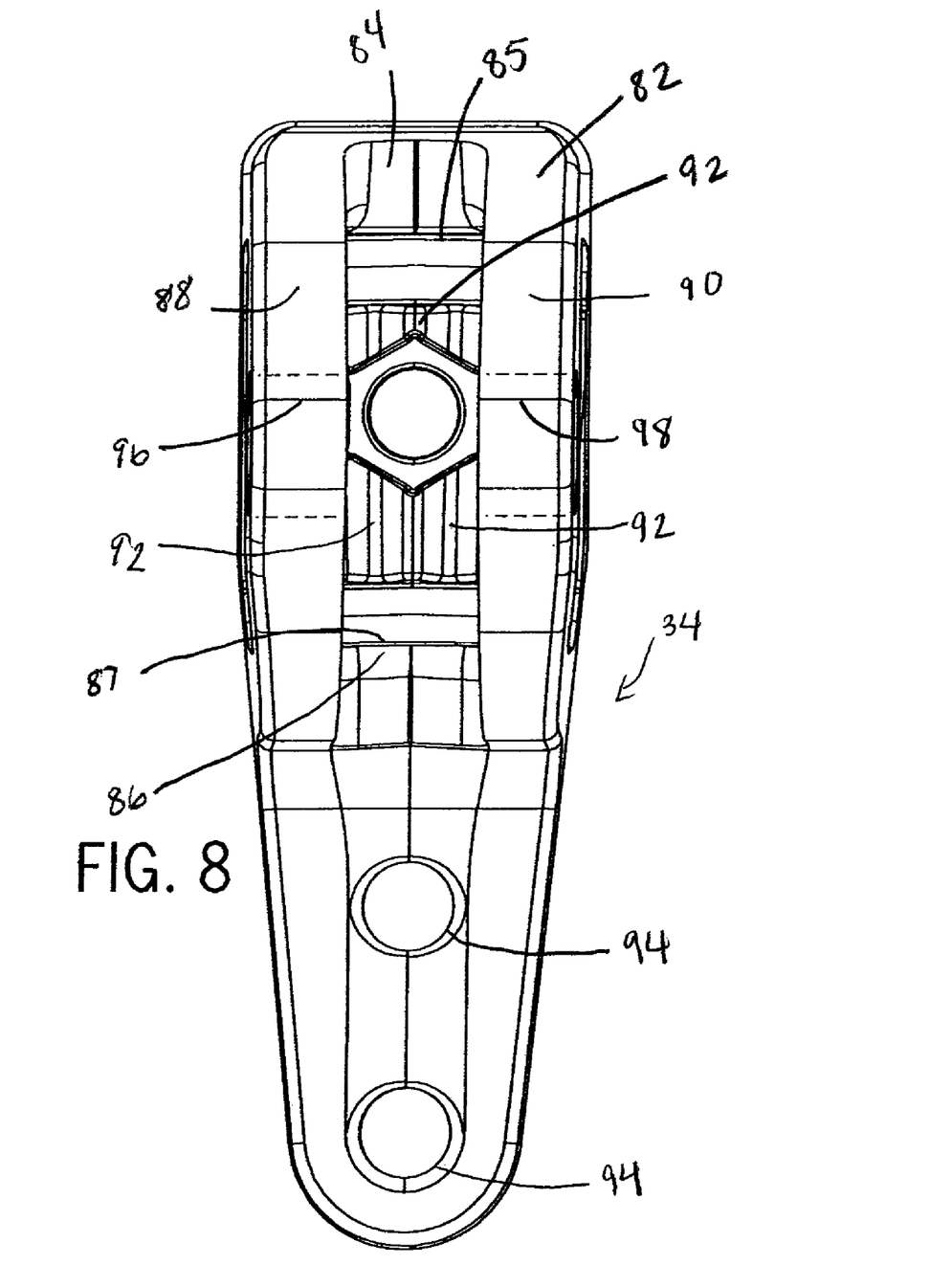
FIG. 8 is front elevation view of an adjustment coupling of the gauge wheel depth adjustment system illustrated in FIG. 5.

Referring now to FIGS. 3 through 7, attachment link 32 includes annular section 66 extending from and a mounting section 68. Mounting section 68 is formed on a side of link 32 and includes an opening 78 for mounting link 32 to main arm 16. Annular section 66 is defined by an outer arc wall 70 and an inner arc wall 72. Referring to FIG. 7, outer arc wall 70 and inner arc wall 72 are designed to commonly extend as though part of a greater circle. To this end, a center point 69 of such a circle can be identified and, extending from center point 69, two radii 71, 73 can be drawn. For example, center point 69 may correspond to pivot axis 24. Outer arc wall 70 has a length greater than inner arc wall 72. In accordance with one embodiment, the specific lengths of the inner and outer arc walls 70, 72 is selected such that radii 71, 73 extend from center point 69 and along a proximal end 75 a distal end 77, relative to mounting section 68. Between radii 71, 73 an angle $\theta$ is formed. For example, in accordance with some embodiments, angle $\theta$ may be 24 or 34 degrees. As shown, the common arc formed by out arc wall 70 and inner arc wall 72 subtends angle $\theta$.

Annular section 66 includes a plurality of link teeth 74 and a plurality of depth adjustment marks 76. Link teeth 74 are radially aligned with respect to pivot axis 24 and center point 69. To form this radial alignment, the cross-sectional area of a given tooth 74 is greater along a portion proximate to outer arc wall 70 than the cross-sectional area of the given tooth 74 along a portion proximate to inner arc wall 72. Arranged on a side of adjustment link 32 opposite teeth 74 is plurality of depth adjustment marks 76. Specifically, depth adjustment markers 76 are positioned on a camming surface 77 of annular section 66 that is opposite to the side where link teeth 74 are formed (i.e., camming surface 77 and depth adjustment marks 76 face away from gauge arm 22 when installed). Hardware, generally designated 80, fixedly attaches link 32 to main arm 16.

Referring now to FIGS. 3 through 6 and 8 through 10, adjustment coupling 34 includes a coupling body 82, a first channel wall 84, a second channel wall 86, a first yoke 88, and a second yoke 90, extending about coupling channel 40. A plurality of coupling teeth 92 are formed on coupling body 82 on a side extending along coupling-channel 40 and a plurality of mounting openings 94 extend through coupling body 82 at an end opposite coupling channel 40. Coupling body 82 is elongate (i.e., its length is greater than its width) and flat on a side that abuts gauge arm 22 when installed. First channel wall 84 extends perpendicularly from a proximal end of coupling body 82 and second channel wall 86 extends perpendicularly from a medial portion of coupling body 82. First and second channel walls 84 and 86 each extend across the width of coupling body 82. First and second yokes 88 and 90 each extend between first and second channel walls 84 and 86. That is yokes 88 and 90 are elongate and aligned along the length of coupling body 82. Coupling body 82, first and second channels walls 84 and 86, and first and second yokes 88 and 90 define coupling channel 40, which is annular and configured to accept adjustment link 32. Coupling channel 40 is annular because first channel wall 84 includes a first curved face 85 and second channel wall 86 includes an upper curved face 87. Coupling teeth 92 extend from coupling body 82 and are positioned within coupling channel 40. Coupling teeth 92 extend across the width of coupling body 82. Coupling teeth 92 do not extend across the entire height of coupling channel 40 as defined by first and second curved faces 85 and 87 so that arc walls 70 and 72 of adjustment link 32 do not interfere with coupling teeth 92. Coupling mating surface 44 discussed above includes coupling teeth 92. Mounting openings 94 are formed in coupling body 82 and, when installed, are positioned adjacent to openings 62 of gauge arm 22, which means that mounting openings 94 are aligned along a line extending parallel with pivot axis 24. A line formed by all of mounting openings 94 is perpendicular to pivot axis 24. One of mounting openings 94 extends through coupling mating surface 44 (see FIG. 8). Hardware 64 extends through openings 94 and fixedly attaches adjustment coupling 34 to gauge arm 22 so that coupling teeth 92 face away from gauge arm 22 (i.e., towards link teeth 74). First yoke 88 includes a first yoke opening 96 and second yoke 90 includes a second yoke opening 98. Yoke openings 96 and 98 form a pivot axis 100 (see FIG. 6) that is perpendicular to the length of coupling body 82). Coupling 34 can be formed of cast iron or other metal made by an appropriate fabrication process.

Referring now to FIGS. 6, 8, 11 and 12, coupling teeth 92 are configured to engage and mate with link teeth 74. Like link teeth 74, coupling teeth 92 are radially aligned with respect to pivot axis 24. The radial alignment of teeth 74 and 92 along pivot axis 24 reduces the stress on link 32 and coupling 34 when gauge wheel 20 is loaded by increasing the range of movement for the amount of stress created. Coupling teeth 92 are further configured to allow for misalignment during engagement with link teeth 74. That is teeth 74 and 92 have complementary tapers configured to self-align during engagement. Furthermore referring to FIGS. 11 and 12, coupling teeth 92 comprise a pair of end teeth 102, a pair of side teeth 104, and a middle tooth 106. Middle tooth 106 extends the furthest from coupling body 82, side teeth 104 extend from coupling body 82 less than middle tooth 106, and end teeth 102 extend from coupling body 82 less than side teeth 104. In other words, coupling teeth 92 have a tooth profile (or width) 108 that varies across its extent, which accounts for any misalignment of teeth 74 and 92. Additionally, when gauge wheel 20 hits a rock during operation, teeth 74 and 92 can be configured to allow link 32 to move within coupling 34 (i.e., roll around) in order to reduce the effect of the forces transferred from gauge wheel 20, which prevents component fatigue. In another embodiment, coupling teeth 92 gradually extend further from coupling body 82 along the vertical height of each tooth (i.e., a tooth extends less or more at its base than at its top). Adjustment link 32 and adjustment coupling 34 can be configured so that link teeth 92 are biased away from coupling teeth 92.

Figure 9:
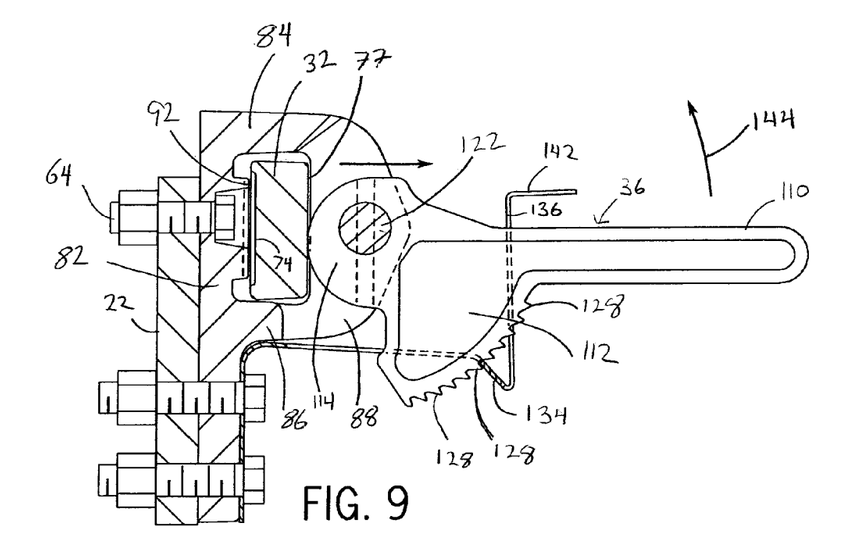
FIG. 9 is a sectional view along line 9-9 of FIG. 3 illustrating the gauge wheel depth adjustment system in an unlocked state.
Figure 10:
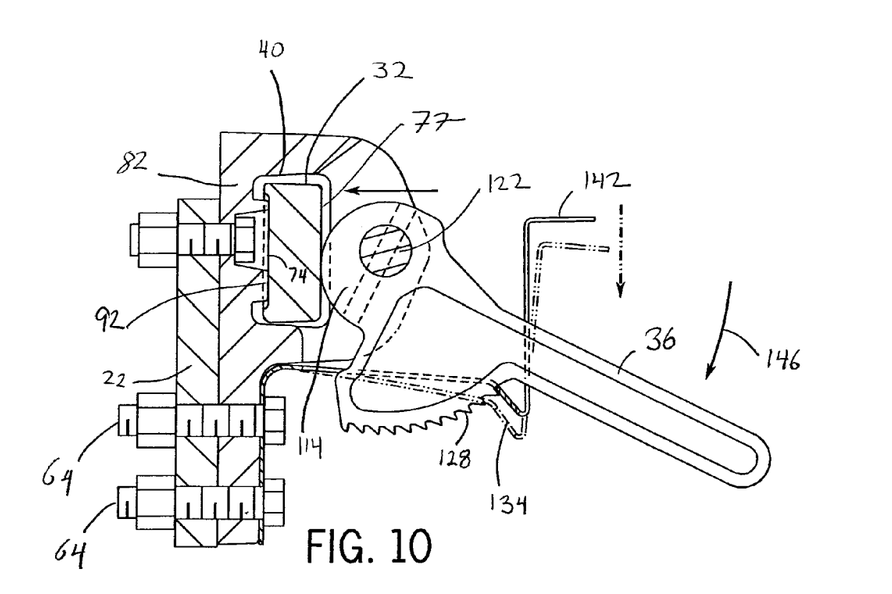
FIG. 10 is a view similar to FIG. 9 except the gauge wheel depth adjustment system is in a locked state.

Referring now to FIGS. 5, 6, 9, and 10, handle 36 is attached to adjustment coupling 34. Handle 36 includes a lever arm 110, a ratchet arm 112, and a cam 114. Cam 114 includes a pivot pin opening 116 that extends through cam 114 to create a pivot axis 118 that is perpendicular to pivot axis 24 when handle 36 is installed. Cam 114 also includes a locking pin opening 120 extending through cam 114 in a direction perpendicular to pivot pin opening 116. Locking pin opening 120 intersects pivot pin opening 116. To pivotably attach handle 36 to adjustment coupling 34, cam 114 is placed between yokes 88 and 90 with pivot pin opening 116 aligned with yoke openings 96 and 98, and then a pivot pin 122 is inserted through openings 96, 98 and 116. Pivot pin 122 includes an opening 124 that is aligned with locking pin opening 120. Accordingly, a lock pin 126 can be inserted through openings 120 and 124 to attach handle 36 to adjustment coupling 34. As shown in FIG. 9, when a length of lever arm 110 is essentially perpendicular to camming surface 77 of adjustment link 32, cam 114 does not force link 32 into engagement with adjustment coupling 34, which is free to move about link 32. As shown in FIGS. 9 and 10, pivot pin opening 116 is not centered in cam 114. Rather, pivot pin opening 116 is positioned off center so that cam 114 cams against camming surface 77 of adjustment link 32 when cam 114 is rotated clockwise, as indicated by arrow 146 in FIG. 10 (i.e., lever arm 110 is moved downward). As cam 114 cams against adjustment link 32, link teeth 74 are pressed into engagement with coupling teeth 92 to mate link 32 and coupling 34, which locks the position of gauge wheel 20 relative to disc opener 18 to set the trench depth cut by disc opener 18.

Figure 5:
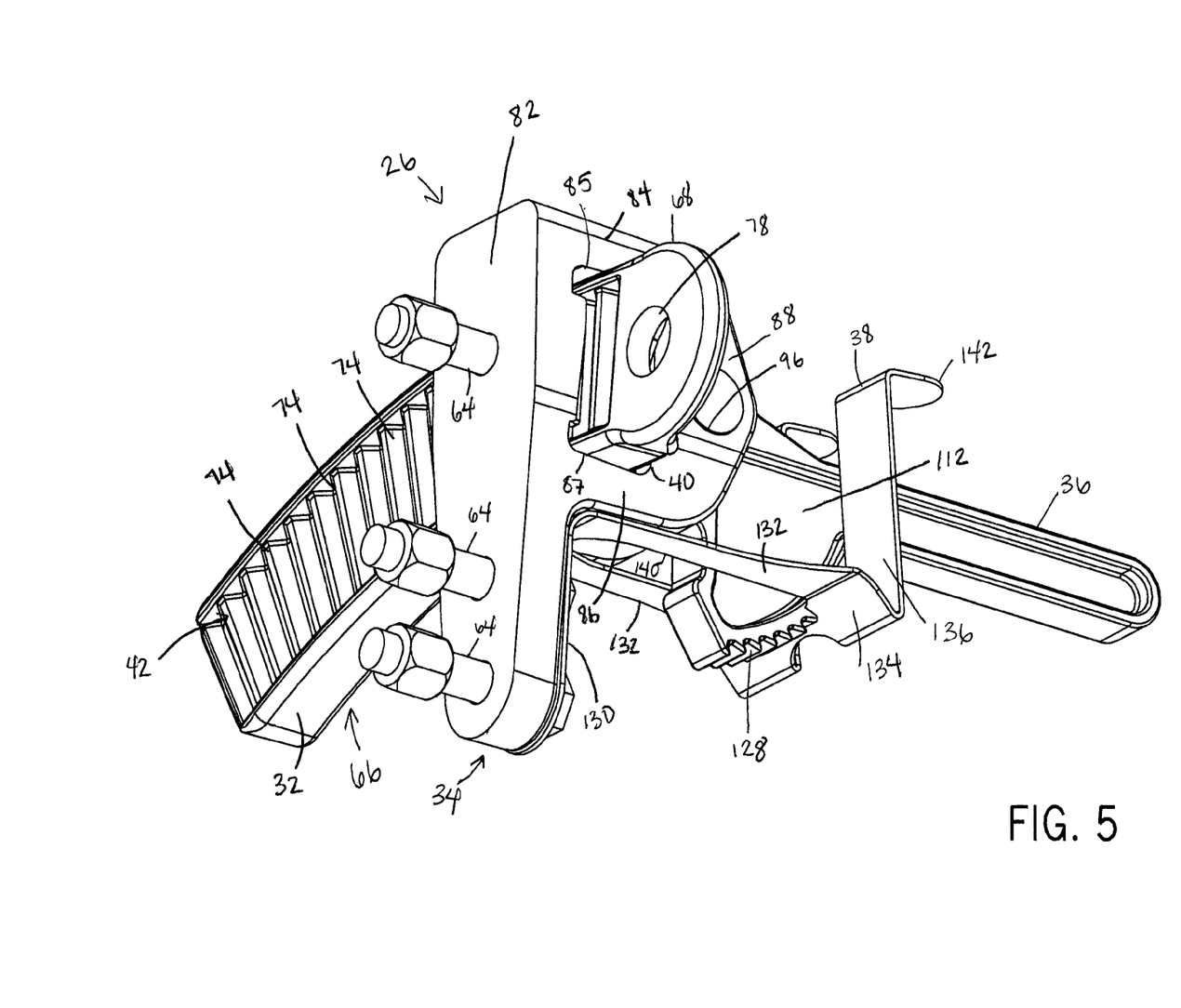
FIG. 5 is a perspective view of a gauge wheel depth adjustment system.

Ratchet arm 112 and spring clip 38 interact to lock cam 114 in a position where link 32 and 34 are mated. In other words, ratchet arm 112 and spring clip 38 positively lock depth adjustment assembly 26. Ratchet arm 112 includes a plurality of ratchet teeth 128 that are positioned beneath lever arm 110. Spring clip 38 includes a mounting plate 130, a pair of leaf springs 132, a bridge 134, and a pair of clip handles 136. Mounting plate 130 includes a pair of mounting openings 138 that align with mounting openings 94 of attachment coupling 34. Hardware 64 extends through mounting openings 138 to attach spring clip 38 and adjustment coupling 34 to gauge arm 22. Leaf springs 132 bend from mounting plate 130 to extend generally perpendicularly from mounting plate 130. Bridge 134 connects across leaf springs 132 and, as shown in FIG. 5, extends downward at about a 45 degree angle with respect to leaf springs 132 (i.e., leaf springs 132 and bridge 134 form about a 135 degree angle). A ratchet arm opening 140 is formed between leaf springs 132 and bridge 134. As shown in FIG. 5, each of clip handles 136 extend upwards from bridge 134 and are inclined towards adjustment coupler 34 by about five degrees (i.e. clip handles 136 would form about a 85 degree angle with leaf springs 132). Clip handles 136 each include a tab 142 for actuation of spring clip 38 from above (as shown in FIG. 10).

Ratchet arm 112 of adjustment handle 36 is positioned within ratchet arm opening 140 with ratchet teeth 128 adjacent bridge 134. Ratchet teeth 129 are oriented such that ratchet teeth 129 can deflect and slide over bridge 134 when lever arm 110 of adjustment handle 36 is rotated towards pivot axis 24, as indicated by arrow 146 in FIG. 10. However bridge 134 engages with ratchet teeth 128 to prevent motion of adjustment handle 36 when lever arm 110 is rotated away from pivot axis 24, as indicated by arrow 144 in FIG. 8. As shown in FIG. 10, disengagement of bridge 134 from ratchet teeth 128 is effected by actuating tabs 142 (i.e., pressing tabs 142 in a downward direction as shown in FIG. 10), which pushes bridge 134 out of alignment with ratchet teeth 128 to allow adjustment handle 36 to be rotated counterclockwise with reference to FIGS. 9 and 10. Spring clip 38 is biased to engage bridge 134 with ratchet teeth 128, but the spring force of spring clip 38 does not solely dictate the locking force of depth adjustment assembly 26. To protect against residue material that is kicked up during the planting process from unlocking/disengaging depth adjustment assembly 26, spring clip 38 can not be disengaged from ratchet teeth 128 by a force directed from below depth adjustment assembly 16. It is understood that other forms of positive-locking mechanisms may also be used to control the motion of adjustment handle 36.

Figure 11:
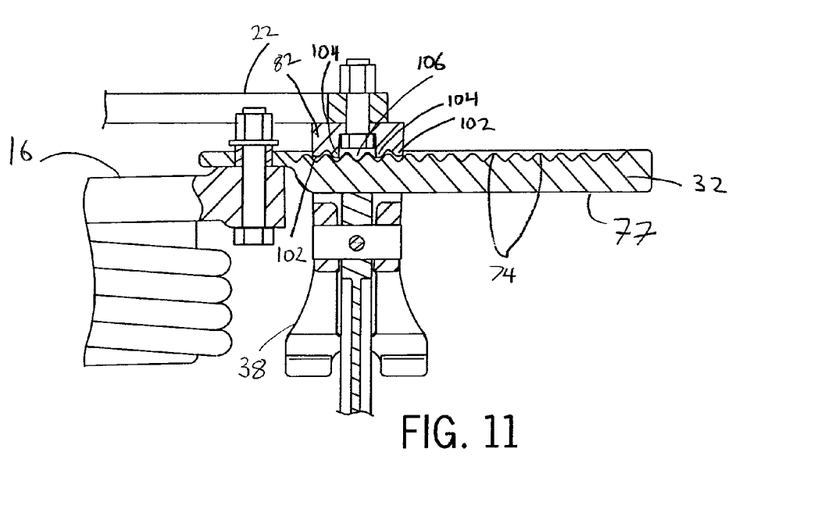
FIG. 11 is a sectional view along line 11-11 of FIG. 3.
Figure 12:
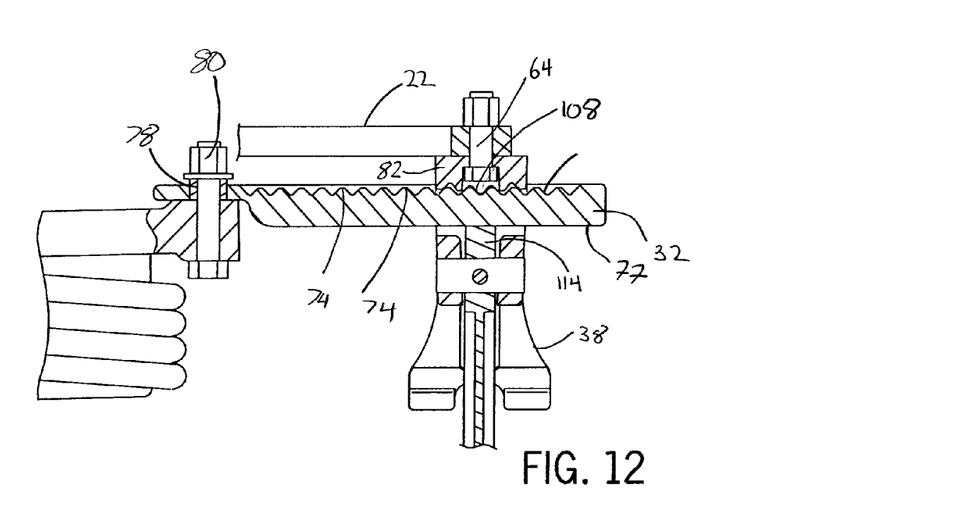
FIG. 12 is a sectional view along line 12-12 of FIG. 4.

Referring now to FIGS. 3, 4, and 9 through 12, its should be appreciated that the depth of a trench formed by disc opener 18 as disc opener assembly 10 is pulled through a field is easily adjustable via depth adjustment assembly 26. To this end, the relative vertical positions of the lower edges of disc opener 18 and gauge wheel 20 are adjustable by actuating spring clip 38 so that spring clip 38 becomes disengaged from ratchet teeth 128 of adjustment handle 36, rotating adjustment handle about pivot pin 122 upward as indicated by arrow 144 in FIG. 9 so that adjustment link 32 uncouples from adjustment coupling 34, rotating adjustment handle 36 and associated gauge arm 22 about pivot axis 24 to a different position, and then rotating adjustment handle 36 about pivot pin 122 downward as indicated by arrow 146 in FIG. 10 so that cam 114 of adjustment handle 36 forces adjustment link 32 to become re-coupled with adjustment coupling 34. Spring clip 38 automatically engages ratchet teeth 128 of adjustment handle 36 to positively lock depth adjustment assembly 26 in the selected relationship of the vertical positions of the lower edges of disc opener 18 and gauge wheel 20. Referring to FIGS. 3 and 11, when adjustment handle 36 and associated gauge arm 22 are rotated in a counter-clockwise direction as indicated by arrow 148 in FIG. 3, gauge arm 22 also rotates in a counter-clockwise direction as indicated by arrow 148 and hence gauge wheel 20 is raised and the trench depth is increased. Referring to FIGS. 4 and 12, similarly, when adjustment handle 36 and associated gauge arm 22 are rotated in a clockwise direction as indicated by arrow 150 in FIG. 4, gauge arm 22 also rotates in a clockwise direction as indicated by arrow 150 and hence gauge wheel 20 is lowered and the trench depth is decreased.

In an embodiment, depth adjustment assembly 26 is configured so that adjustment handle 36 can move in increments, which can be indicated by depth adjustment marks 76. For example, depth adjustment assembly 26 can be configured so that adjustment handle 36 can move in 0.5 inch increments to place seeds from 0 to 3.5 inches.

Several example embodiments of the invention have been described in considerable detail. Many modifications and variations to the example embodiments described will be apparent to a person of ordinary skill in the art. Therefore, the invention should not be limited to the preferred example embodiments described. Accordingly, while gauge wheel 20 is shown to reside generally behind and partially laterally to one side of disc opener 18, other configurations are contemplated wherein gauge wheel 20 resides entirely behind disc opener 20 or to the opposite side of disc opener 20. Moreover, additional other wheels and assembly components may be secured to the main arm member or the gauge arm member such as, for instance, packer wheels, sensors, seed tubes, fertilizer tubes, and the like.

We claim:

1. A method for adjusting a gauge wheel about a pivot axis to change a position of the gauge wheel relative to a disc opener of a disc opener assembly, the method comprising:
providing a depth adjustment assembly including an adjustment link, said adjustment link including a link mating surface and a link camming surface; an adjustment coupling configured to selectively engage the adjustment link, said adjustment coupling including a yoke, a channel configured to receive the adjustment link, and a coupling mating surface configured to mate with the link mating surface, the adjustment link positioned within the channel and the coupling mating surface positioned adjacent to the link mating surface; a handle configured to rotate the gauge wheel about the pivot axis and selectively place the adjustment link into engagement with the adjustment coupling, said handle includes a plurality of ratchet teeth and a cam configured to engage the link camming surface to force the link mating surface to mate with the coupling mating surface; and a spring clip configured positively lock depth adjustment assembly by engaging the handle; said spring clip configured to engage at least one of the plurality of ratchet teeth, said spring clip includes a mounting plate, a pair of leaf springs, a bridge and a pair of clip handles; said leaf springs bend from said mounting plate to extend generally perpendicular from said mounting plate; said clip handles each include a tab for actuation of spring clip; a ratchet opening is formed between leaf springs and bridge; said clip handles extend upwards from said bridge and are inclined towards adjustment coupler;
rotating the gauge wheel to a selected position;
actuating the handle to place the adjustment link into engagement with the adjustment coupling; and
positively locking the depth adjustment assembly.

2. The method of claim 1, further comprising the step of unlocking the depth adjustment assembly by actuating the spring clip to allow the handle to move to a position where the adjustment link and adjustment coupling can be disengaged.

3. The method of claim 2, wherein the step of positively locking the depth adjustment assembly comprises engaging the spring clip with at least one a plurality of ratchet teeth formed on the handle.

4. The method of claim 1, further comprising the step of unlocking the depth adjustment assembly with a force applied generally from a side of the depth adjustment assembly opposite the pivot axis.

5. The method of claim 1, wherein the step of actuating the handle to place the adjustment link into engagement with the adjustment coupling comprises mating a plurality of coupling teeth formed radially along the pivot axis on the adjustment link with a plurality of coupling teeth formed radially along the pivot axis on the adjustment coupling.

6. A disc opener assembly for attachment to an agricultural vehicle, comprising:
a main arm;
a disc opener mounted to the main arm;
a gauge arm mounted about a pivot axis to the main arm;
a gauge wheel mounted for rotation on the gauge arm; and
a depth adjustment assembly for adjusting a position of the gauge wheel relative to the disc opener, the depth wheel adjustment assembly comprising:
an adjustment link; said adjustment link includes an annular section defined by an outer arc wall and an inner arc wall; said annular section includes a plurality of link teeth and a plurality of depth adjustment marks; said depth adjustment marks are positioned on a camming surface of annular section;
an adjustment coupling configured to selectively engage the adjustment link;
a handle configured to rotate the gauge arm about the pivot axis and selectively place the adjustment link into engagement with the adjustment coupling; said handle includes a lever arm, a ratchet arm and a cam; said ratchet arm includes a plurality of ratchet teeth that are positioned beneath lever arm; and
a spring clip configured to engage the handle to positively lock the depth adjustment assembly; said spring clip includes a mounting plate, a pair of leaf springs, a bridge and a pair of clip handles; said leaf springs bend from said mounting plate to extend generally perpendicular from said mounting plate; said clip handles each include a tab for actuation of spring clip; a ratchet opening is formed between leaf springs and bridge; said clip handles extend upwards from said bridge and are inclined towards adjustment coupler;

wherein ratchet arm of adjustment handle is positioned within ratchet arm opening with ratchet teeth and adjacent to bridge;

wherein ratchet teeth are oriented such that ratchet teeth can deflect and slide over bridge when lever arm of adjustment handle is rotated towards pivot axis;

wherein spring clip is biased to engage bridge with ratchet teeth.

7. The disc opener assembly of claim 6, wherein the depth adjustment assembly is configured to only be disengaged by a force applied generally from a side of the depth assembly opposite the pivot axis.

8. The disc opener assembly of claim 7, wherein the handle includes a cam that forces the adjustment link into engagement with the adjustment coupling when the handle is rotated in a direction towards the pivot axis.

9. The disc opener assembly of claim 8, wherein the handle includes a plurality of ratchet teeth and the spring clip is configured to positively lock the depth adjustment assembly by engaging at least one of the plurality of ratchet teeth.

10. A disc opener assembly for attachment to an agricultural vehicle, comprising:

a main arm;

a disc opener mounted to the main arm;

a gauge arm mounted about a pivot axis to the main arm;

a gauge wheel mounted for rotation on the gauge arm; and a depth adjustment assembly for adjusting a position of the gauge wheel relative to the disc opener, the depth wheel adjustment assembly comprising:

an adjustment link mounted to the main arm, the adjustment link including a link mating surface and a link camming surface; said adjustment link includes an annular section defined by an outer arc wall and an inner arc wall; said annular section includes a plurality of link teeth and a plurality of depth adjustment marks; said depth adjustment marks are positioned on said camming surface of annular section;

an adjustment coupling attached to the gauge arm, the adjustment coupling including a yoke, a channel configured to receive the adjustment link, and a coupling mating surface configured to mate with the link mating surface, the adjustment link positioned within the channel and the coupling mating surface positioned adjacent to the link mating surface;

a handle pivotably attached to the yoke, the handle including a plurality of ratchet teeth and a cam configured to engage the link camming surface to force the link mating surface to mate with the coupling mating surface; and a spring clip attached to the adjustment coupling, the spring clip configured to engage at least one of the plurality of ratchet teeth, said spring clip includes a mounting plate, a pair of leaf springs, a bridge and a pair of clip handles; said leaf springs bend from said mounting plate to extend generally perpendicular from said mounting plate; said clip handles each include a tab for actuation of spring clip; a ratchet opening is formed between leaf springs and bridge; said clip handles extend upwards from said bridge and are inclined towards adjustment coupler.

11. The disc opener assembly of claim 10, wherein the position of the gauge wheel relative to the disc opener is positively locked when the spring clip engages at least one of the plurality of ratchet teeth to mate the link mating surface with the coupling mating surface.

12. The disc opener assembly of claim 11, wherein the spring clip can be disengaged from the at least one of the plurality of ratchet teeth by a force applied from a side of the clip opposite the pivot axis.

13. The disc opener assembly of claim 10, wherein the depth adjustment assembly can only be disengaged by a force applied in a direction at least partially towards the pivot axis.

14. The disc opener assembly of claim 10, wherein the link mating surface comprises a plurality of link teeth and the coupling mating surface comprises a plurality of coupling teeth.

15. The disc opener assembly of claim 14, wherein the link teeth and the coupling teeth are radially aligned with respect to the pivot axis.

16. The disc opener assembly of claim 15, wherein the plurality of coupling teeth have a coupling tooth profile with a varied width.

17. The disc opener assembly of claim 14, wherein the coupling teeth have a tapered tooth profile.

18. The disc opener assembly of claim 10, wherein the adjustment link includes an annular portion arcing about the pivot axis.

19. The disc opener assembly of claim 18, wherein the adjustment link includes a plurality of teeth extending across the annular portion and extending radially with respect to the pivot axis.

20. The disc opener assembly of claim 10, further comprising a plurality of markings formed on the adjustment link to form an adjustment increment display.

* * * * *